April 26, 1932. J. L. BROWNELL 1,855,179
ADJUSTABLE VEHICLE SEAT
Filed Oct. 10, 1929   2 Sheets-Sheet 1

INVENTOR
James L. Brownell
BY Chappell & Earl
ATTORNEYS

April 26, 1932.　　　J. L. BROWNELL　　　1,855,179
ADJUSTABLE VEHICLE SEAT
Filed Oct. 10, 1929　　　2 Sheets-Sheet 2

INVENTOR
James L. Brownell
BY Chappell & Earl
ATTORNEYS

Patented Apr. 26, 1932

1,855,179

UNITED STATES PATENT OFFICE

JAMES L. BROWNELL, OF KALAMAZOO, MICHIGAN, ASSIGNOR TO CHECKER CAB MANUFACTURING CORPORATION, OF KALAMAZOO, MICHIGAN

ADJUSTABLE VEHICLE SEAT

Application filed October 10, 1929. Serial No. 398,645.

The main objects of this invention are:

First, to provide an adjusting means for vehicle seats which enables the rapid adjustment of the seat and at the same time is strong and rigid and not likely to be broken in use.

Second, to provide a structure having these advantages which is compact and may be readily installed in concealed position in single seats.

Objects pertaining to details and economies of my invention will definitely appear from the description to follow. The invention is defined in the claims.

A structure which embodies the features of my invention is clearly illustrated in the accompanying drawings, in which.

Figure 1:
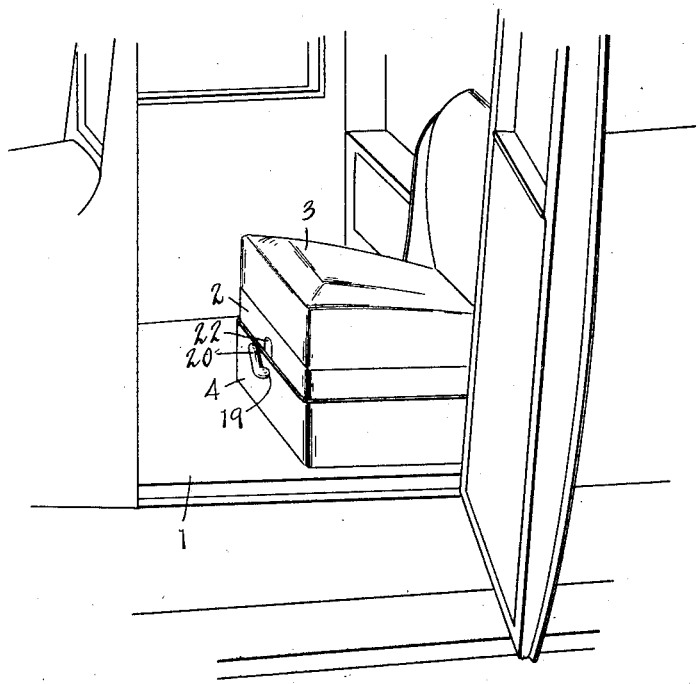
Fig. 1 is a fragmentary perspective view of a motor vehicle having a driver's seat embodying the features of my invention.

In the embodiment illustrated 1 represents the floor of the vehicle. The seat frame 2 is supported for vertical adjustment and adapted to carry the cushion 3.

To guide the seat in its vertical movement I provide a frame-like guide member 4 secured to the floor of the vehicle, the frame 2 being adapted to telescope within this guide member. The guide member is preferably formed of metal having an inturned flange 5 at its lower end by means of which it is secured to the floor.

Centrally within this guide member 4 I mount a supporting bracket 6 having a pair of upwardly projecting spindle bearing members 7 and 8 and two pairs of pivot ears 9. The pivot ears are mounted at the ends of the bracket while the bearing members are disposed centrally between the pivot ears.

Figure 2:
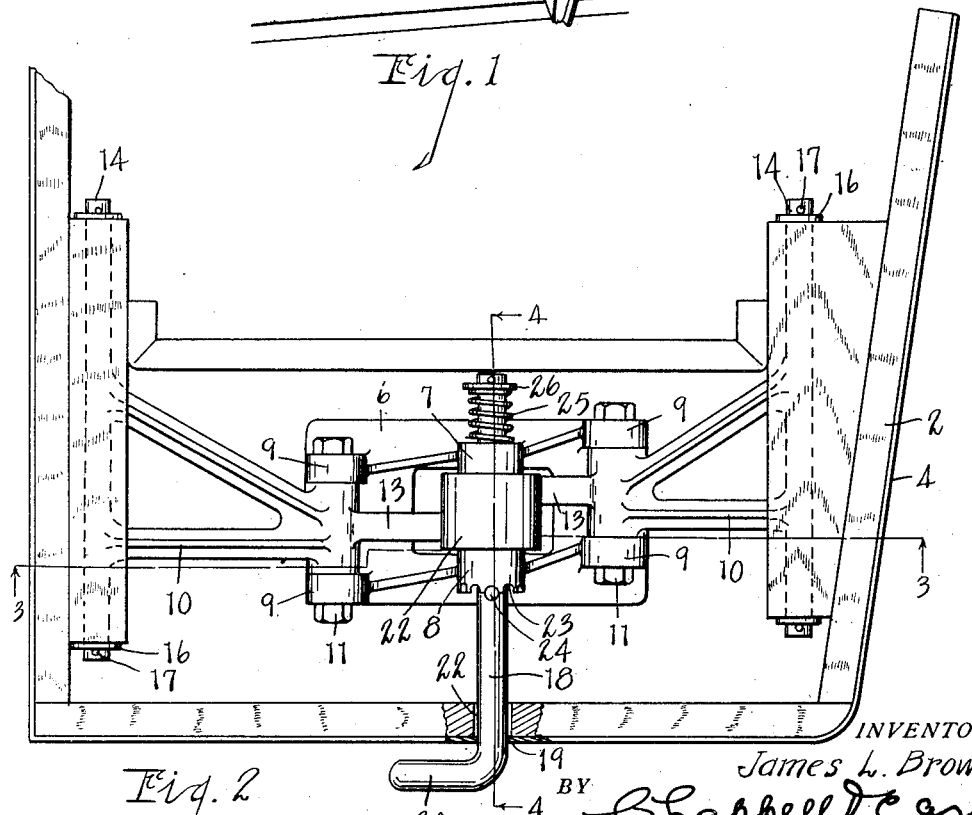
Fig. 2 is a fragmentary view with the seat cushion removed.
Figure 3:
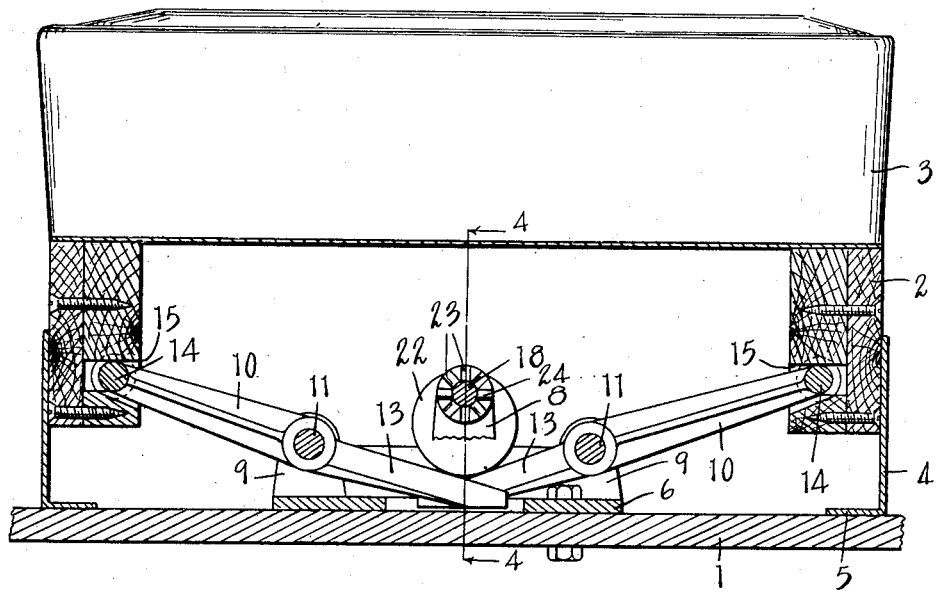
Fig. 3 is a fragmentary view mainly in vertical section on a line corresponding to line 3—3 of Figs. 2 and 4.
Figure 4:
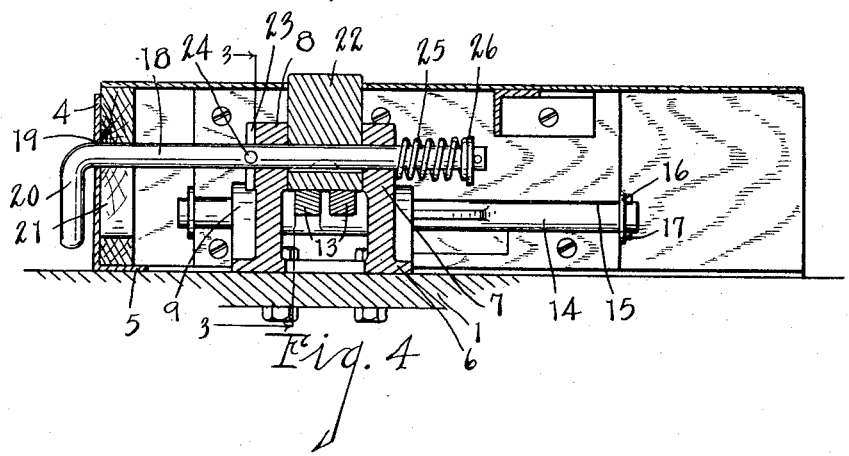
Fig. 4 is a fragmentary view mainly in vertical section on line 4—4 of Fig. 3.

The levers 10 are mounted on the pivots 11 carried by these pivot ears with the inner arms 13 of the levers disposed in crossed relation between the bearing members 7 and 8. The outer ends of the levers are forked and provided with cylindrical cross pieces 14 at their outer ends. These cross pieces are engaged in the slot-like bearings 15 in the seat frame, the seat frame resting on these cross arms. The cross arms are provided with collars 16 and pins 17 at the ends of the seat frame bearing parts as shown in Fig. 2.

The spindle 18 is arranged in the bearing members with its outer end projecting through an opening 19 provided in the guide member 4 and turned laterally to provide a handpiece 20. The front member of the seat frame is slotted at 21 to receive the spindle.

The cam 22 on the spindle coacts with the crossed ends of the levers adjustably supporting the same; that is, as the cam is rotated the ends of the levers are forced downwardly or permitted to swing upwardly against the cam.

The bearing member 8 has a plurality of notches 23 adapted to receive the pin-like detent 24 on the spindle for locking the cam in its adjusted position. The coiled spring 25 arranged between the bearing member 7 and the collar 26 on the spindle yieldingly holds the detent in engagement with its keeper.

With the parts thus arranged the seat may be very quickly adjusted at any point within its range of adjustment, it is firmly supported, and the parts are economical to produce and very strong and rigid.

I have not attempted to illustrate or describe other adaptations or embodiments of my improvements as it is believed that this disclosure will enable those skilled in the art to embody or adapt my improvements as may be desired.

Having thus described my invention what I claim as new and desire to secure by Letters Patent is:

1. The combination of a seat frame having inwardly facing opposed elongated slot-like bearings, a frame-like guide member with which said seat frame is telescopingly associated, a supporting bracket disposed centrally within said guide member and provided with a pair of upwardly projecting spindle bearing members with a pair of pivot ears at each side thereof, independent oppositely disposed levers pivotally mounted on said pivot ears with their inner ends disposed side by side in crossed overlapping relation between said spindle bearings, said levers having cylindrical cross arms at their outer ends engaged in said bearings on said seat frame, a spindle mounted in said bearing members for rotative and longitudinal movement and projecting through said guide member for manipulation, a cam mounted on said spindle between said bearing members to engage the ends of said levers, a detent mounted on said spindle, one of said bearing members being notched to provide a plurality of keepers coacting with said detent, and a spring on said spindle acting to urge said detent into engagement with said keepers.

2. The combination of a seat frame having inwardly facing opposed elongated slot-like bearings, a frame-like guide member with which said seat frame is telescopingly associated, a supporting bracket disposed centrally within said guide member and provided with a pair of upwardly projecting spindle bearing members with a pair of pivot ears at each side thereof, independent oppositely disposed levers pivotally mounted on said pivot ears with their inner ends disposed side by side in crossed overlapping relation between said spindle bearings, said levers having cylindrical cross arms at their outer ends engaged in said bearings on said seat frame, a spindle mounted in said bearing members and projecting through said guide member for manipulation, and a cam mounted on said spindle between said bearing members to engage the ends of said levers.

3. The combination of a vertically movable seat frame having opposed elongated bearings, a support provided with a pair of upwardly projecting spindle bearing members with a pair of pivot ears at each side thereof, independent oppositely disposed levers pivotally mounted on said pivot ears with their inner ends disposed side by side in crossed overlapping relation between said spindle bearings, said levers having cross arms at their outer ends engaging the said bearings on said seat frame, a spindle mounted in said bearing members for rotative and longitudinal movement, a cam mounted on said spindle between said bearing members to engage the ends of said levers, a detent mounted on said spindle, one of said bearing members being notched to provide a plurality of keepers coacting with said detent, and a spring on said spindle acting to urge said detent into engagement with said keepers.

4. The combination of a vertically movable frame having opposed elongated bearings, a support provided with a pair of upwardly projecting spindle bearing members with a pair of pivot ears at each side thereof, independent oppositely disposed levers pivotally mounted on said pivot ears with their inner ends disposed side by side in crossed overlapping relation between said spindle bearings, said levers having cross arms at their outer ends engaging said bearings on said seat frame, a spindle mounted in said bearing members, and a cam mounted on said spindle between said bearing members to engage the ends of said levers.

5. The combination of a support provided with a pair of upwardly projecting spindle bearing members and with a pair of pivot ears at each side thereof, independent oppositely disposed levers pivotally mounted between said pairs of pivot ears with their inner ends disposed in overlapping relation between said spindle bearings, a seat mounted on the outer ends of said levers, a spindle mounted in said bearing members for rotative and longitudinal movement, a cam mounted on said spindle between said bearing members to engage the ends of said levers, a detent mounted on said spindle, one of said bearing members being notched to provide a plurality of keepers coacting with said detent, and a spring on said spindle acting to urge said detent into engagement with said keepers.

6. The combination of a support provided with a pair of upwardly projecting spindle bearing members and with a pair of pivot ears at each side thereof, independent oppositely disposed levers pivotally mounted between said pairs of pivot ears with their inner ends disposed side by side in crossed overlapping relation between said spindle bearings, a seat mounted on the outer ends of said levers, a spindle mounted in said bearing members, and a cam mounted on said spindle between said bearing members to engage the ends of said levers.

7. The combination of a support provided with a pair of upwardly projecting spindle bearing members and with a pair of pivot ears at each side thereof, independent oppositely disposed levers pivotally mounted between said pairs of pivot ears with their inner ends disposed side by side in crossed overlapping relation between said spindle bearings, a seat mounted on the outer ends of said levers, a spindle mounted in said bearing members, a cam mounted on said spindle between said bearing members to coact with the ends of said levers, and means for holding said spindle in its adjusted positions.

In witness whereof I have hereunto set my hand.

JAMES L. BROWNELL.